United States Patent [19]
Woessner

[11] 3,777,697
[45] Dec. 11, 1973

[54] INDICATOR DEVICE FOR COLLAPSIBLE FLUID CONTAINER

[75] Inventor: Roger J. Woessner, Lindenhurst, Ill.

[73] Assignee: Baxter Laboratories, Inc., Morton Grove, Ill.

[22] Filed: Apr. 7, 1972

[21] Appl. No.: 241,940

[52] U.S. Cl.................. 116/118 R, 128/127, 222/2
[51] Int. Cl. .......................................... G01f 23/00
[58] Field of Search.................. 116/118 R; 73/307, 73/309, 310, 314, 319, 320, 322.5; 222/2, 3, 31, 41, 49, 50, 51, 92, 107, 158, 386; 33/1 B, 104, 174 B; 128/227, 214 C, 214 D, 214 E, 272

[56] References Cited
UNITED STATES PATENTS

| D141,882 | 7/1945 | Matson | 33/174 B X |
|---|---|---|---|
| 2,083,603 | 6/1937 | Harwick | 222/95 |
| 2,328,569 | 9/1943 | McGaw | 128/127 X |
| 2,445,101 | 7/1948 | Bailey | 222/158 X |
| 3,205,889 | 9/1965 | Alder et al. | 128/214 D X |
| 3,215,299 | 11/1965 | Coanda et al. | 222/158 X |
| 3,437,243 | 4/1969 | Farnsworth | 116/118 X |

Primary Examiner—Louis J. Capozi
Attorney—W. Garrettson Ellis et al.

[57] ABSTRACT

An indicator device is disclosed for measuring the volume of fluid present in a flexible container which collapses flat. The indicator device is a flat, generally stiff plate defining an aperture having an oval central portion, as well as a pair of auxiliary oval portions at opposite ends of the long axis of the oval central portion and communicating therewith. The indicator device slides downwardly along the collapsible container as the container empties, giving a uniformly reproducible indication of the amount of fluid remaining in the container.

14 Claims, 5 Drawing Figures

PATENTED DEC 11 1973  3,777,697
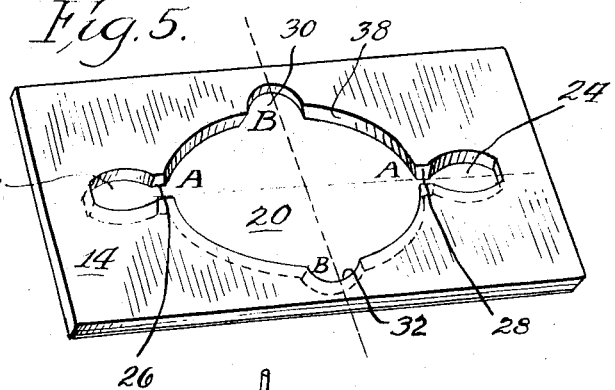
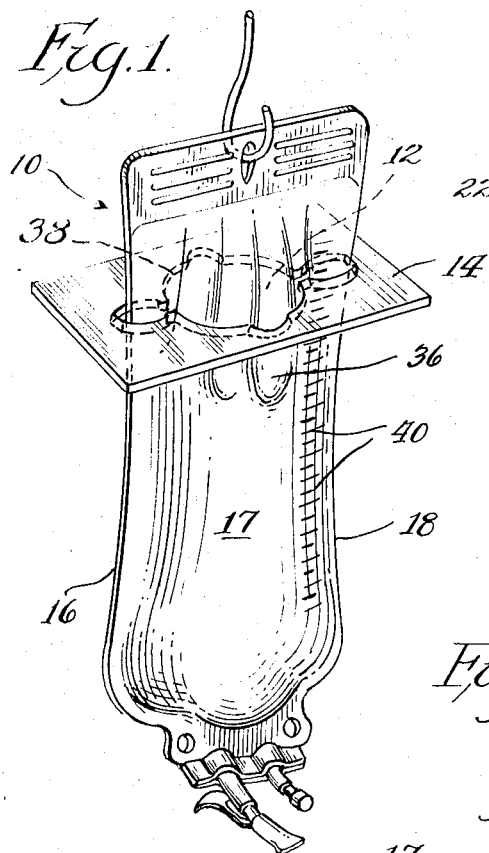
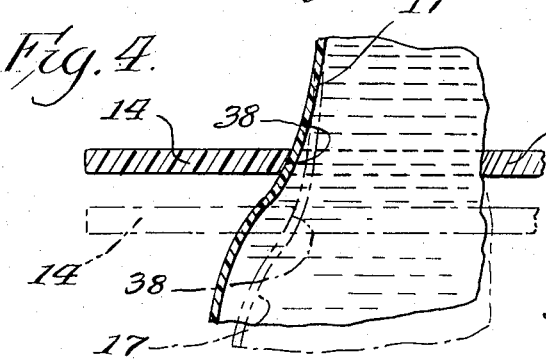
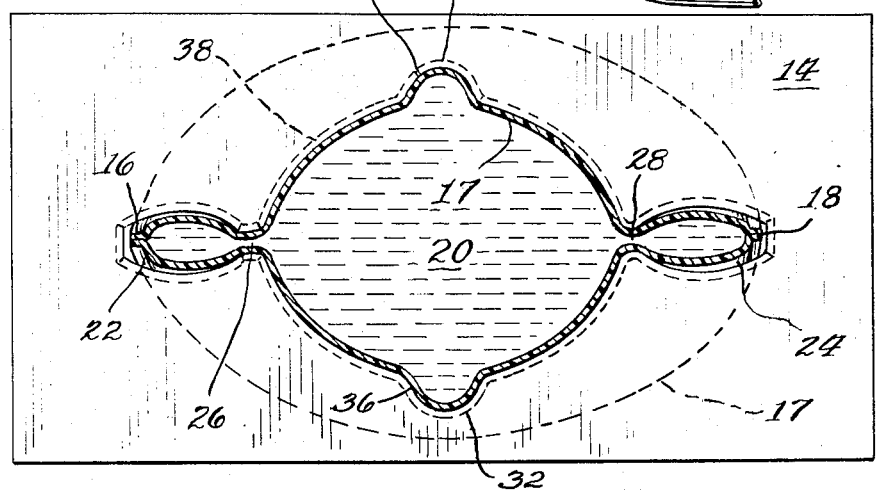

INDICATOR DEVICE FOR COLLAPSIBLE FLUID CONTAINER

BACKGROUND OF THE INVENTION

Flexible, collapsible plastic containers for fluids are finding increasing commercial use in many fields. In particular, they find special advantage in the medical field, particularly for packaging parenteral solutions, blood, and the like. One particular advantage is that they eliminate the need to provide an air vent in the container since the container walls simply collapse around the shrinking volume of fluid as it is drained from the container. This is particularly advantageous in the medical field since a greater degree of sterility is maintained inside of the container if air is not vented onto it.

A problem that arises with collapsible containers for parenteral solutions is that it is fairly difficult to make a reasonably accurate determination, to within 50 or 100 cc. or so, of how much fluid remains in the container. Furthermore, it is quite difficult to make even a rough estimate of the amount of fluid left in the container from across a hospital ward by, for example, a nurse who takes a quick glance at the container while going about other urgent duties.

The invention of this application provides a solution to the above problems in that an accurate, readily visible means is provided to give an accurate indication of the amount of fluid remaining in a draining flexible, collapsible container without close examination.

DESCRIPTION OF THE INVENTION

In accordance with this invention, an indicator device is provided for use with a flexible, collapsible fluid container which has a fluid access port at one end thereof, and which collapses to generally flat configuration upon emptying. The indicator device of this invention is a flat, generally stiff, plate having a shaped aperture therein. The collapsible fluid container fits through the aperture, and as the fluid is drained from the bottom of the hanging collapsible container, the indicator device slowly slides down the container to positions corresponding to the amount of fluid emptied from the container.

The shape of the aperture is especially selected to cause the indicator device to slide downwardly along the container in a uniformly reproducible manner, so that the volume of fluid remaining in the container (and the volume administered) can be accurately determined at all times. The aperture in the plate has an oval central portion, and also defines a pair of auxiliary oval portions at opposite ends of the long axis of the oval central portion. The auxiliary portions are smaller than the central portion and receive the lateral edges of a cross-sectional portion of the flat-collapsing container. The central and auxiliary portions of the aperture cooperatively define throat portions communicating between the central and auxiliary portions, through which throat portions the edges of the container extend.

Optionally, for improved accuracy of reading, the central aperture in the plate of this invention also defines a pair of small, generally semicircular portions facing and communicating with the oval central portion at opposite ends of the short axis of the oval central portion. These portions receive and hold longitudinal folds in the container which tend to form as the container collapses. This contributes to the uniformity at which the indicator device slides downwardly along the collapsing container.

In the drawings of this application,

FIG. 1 is a perspective view of a flexible, flat-collapsing container for parenteral solutions, being shown suspended from its top and passing through the aperture of the indicator device of this invention.

FIG. 2 is another perspective view of the same arrangement after a portion of parenteral solution in the container has been withdrawn from the bottom outlet.

FIG. 3 is a transverse sectional view taken along line 3—3 of FIG. 2, showing details of the aperture in the indicator device and the relationship of the flexible container wall passing through it.

FIG. 4 is a fragmentary, longitudinal sectional view taken along line 4—4 of FIG. 2.

FIG. 5 is a perspective view of the indicator device of this invention.

Referring to the drawings, flexible, collapsible container 10 is shown to be placed through the aperture 12 of plastic indicator plate 14, which is a rectangular plate defining aperture 12 and having, typically, a length of about 7 inches, a width of about 4 inches, and a thickness of about three-sixteenths inch. The indicator plate is desirably of rigid plastic, such as polystyrene, but it can also be made from semiflexible materials such as polyethylene, paperboard, and the like.

Collapsible container 10 can be made from a pair of flexible plastic sheets, heat sealed or the like along edges 16, 18 to form container wall 17. Thus, the container tends to collapse to a flat configuration along lateral edges 16, 18. Other suitable containers may be integral tubular devices having a longitudinal crease on opposed sides to facilitate flat collapse.

The aperture of indicator plate 14 defines an oval central portion 20 having a long axis A—A and a short axis B—B (FIG. 5). Communicating with oval central portion 20 are a pair of smaller auxiliary oval aperture portions 22, 24 having long axes which are generally coaxial with the long axis A—A of central portion 20. Both auxiliary portions define, in conjunction with the central portion, throat portions 26, 28 of the aperture, which communicate between the central portion 20 and auxiliary portions 22, 24.

The purpose of this configuration is shown in FIG. 3, in which a cross-sectional portion of the bag wall 17 is shown to be contained within aperture 20, but the same cross-sectional portion of lateral edges 16, 18 and their adjacent bag wall are contained within auxiliary oval portions 22, 24 of the aperture. This prevents twisting of container 10 and holds it in position for a uniform collapse as solution is withdrawn from outlet 25, and indicator plate 14 slides down container 10.

It will be noted from the drawings that indicator plate 14 constricts the container wall 17 together with respect to the portion of the container which still contains fluid. In particular, throat portions 26, 28 of the aperture provide an area of maximum constriction which controls the level of indicator plate 14 on the emptying flexible container. If it is desired for the indicator plate to rest at a position higher on the flexible container than shown in the drawings at the same fluid volume, one need only provide an aperture design in which throat portions 26, 28 are narrower than shown. Conversely, if the indicator plate 14 is to rest in a lower position on the flexible container at a given fluid volume, throat portions 26, 28 can be widened.

Further reliability and accuracy is provided to the indicator plate 14 by providing aperture 12 with a pair of small, generally semicircular portions 30, 32 at opposite ends of short axis B—B of central portion 20 of the aperture. These provide room for longitudinal folds 34, 36 which tend to form in flexible, collapsible containers of the shape shown as fluid is withdrawn from them. By providing a recess for the fold to form, undue binding of the flexible container against the indicator plate 14 is eliminated, and flexible container 10 tends to collapse in a more uniform manner, all of which results in a more accurate reading provided by the indicator plate as it slides down the container in more uniformly reproducible manner.

Inner peripheral wall 38 of plate 14, which defines aperture 12, is typically shaped to angle downwardly and outwardly in position of use, preferably at an angle of about 20° to 60° from the vertical, as shown in FIG. 4. This facilitates the downward sliding of indicator plate 14, which constricts the bag wall 17 as it slides, as shown in the phantom drawing of FIG. 4.

Accordingly, the indicator plate of this invention provides a means to quickly and accurately determine the amount of fluid remaining or expended in a flexible, collapsible container for parenteral solutions or any other fluid when viewed from a distance. If desired, a graduated numerical scale 40 can be placed on the bag to show the amount of fluid expended from the container, and the width of throat portions 26, 28 can be adjusted so that indicator plate 14 rests on a particular number of the graduated scale corresponding to the actual fluid volume expended from the container at that moment.

The particular indicator plate 14 shown herein and having the dimension and size mentioned above is designed to give an accurate reading of expended fluid volume in cooperation with the graduated scale marked on the presently available VIAFLEX parenteral solution container sold by Baxter Laboratories, Inc. of Morton Grove, Ill. Minor design changes, including small changes in the dimension of throat portions 26, 28, will render the indicator plate of this invention suitable for use in any flat-collapsing solution container having similar indicia to indicate the volume of fluid either remaining in the container or expended from it.

The above is offered for illustrative purposes only, and is not for the purpose of limiting the invention, which is described in the claims below.

That which is claimed is:

1. An indicator device for measuring the volume of fluid present in a flexible, collapsible container, and adapted, by its particular configuration, to fit over and be carried by said container, said device comprising a flat, generally stiff plate defining an aperture having an oval central portion, said aperture also defining a pair of auxiliary oval portions which are smaller than said central portion and are positioned at opposite ends of the long axis of said oval central portion, said auxiliary portions having long axes which are generally coaxial with the long axis of said central portion, said central portion and auxiliary portions defining throat portions providing communication between said central and auxiliary portions.

2. The indicator device of claim 1 in which said aperture also defines a pair of small, generally semicircular portions facing and communicating with said oval central portion at opposite ends of the short axis of said oval central portion.

3. The indicator device of claim 2 which is a rectangular plastic plate defining said aperture.

4. The indicator device of claim 3 in which said plate has a length of about 7 inches, a width of about 4 inches, and a thickness of about three-sixteenths inch.

5. The indicator device of claim 2 in which the inner peripheral wall of said plate defining said aperture is angled outwardly about 20° to 60° from a direction perpendicular to the plane of the indicator plate.

6. A flexible, collapsible, fluid container having a fluid access port at one end thereof, said container carrying an indicator device for measuring the fluid volume within said container, which indicator device comprises a flat, generally stiff plate defining an aperture having an oval central portion, said aperture also defining a pair of auxiliary oval portions which are smaller than said central portion, positioned at opposite ends of the long axis of said oval central portion, said auxiliary portions having long axes which are generally coaxial with the long axis of said central portion, said central portion and auxiliary portions defining throat portions providing communication between said central and auxiliary portions, the lateral edges of a cross-sectional portion of the flat collapsing container fitting within said auxiliary oval portions, and the remainder of the container in the same cross-sectional portion fitting within said oval central portion, whereby, as fluid is drained from the bottom of said container while the container is vertically hung, the indicator device slides downwardly along the container in uniformly reproducible manner to indicate the volume of fluid remaining in the container.

7. The container and indicator device of claim 6 in which said aperture also defines a pair of small, generally semicircular portions facing and communicating with said oval central portion at opposite ends of the short axis of said oval, central portion, to accommodate longitudinal folds which form as said container collapses.

8. The container and indicator device of claim 7 in which said container comprises a pair of plastic sheets sealed at their edges.

9. The container and indicator device of claim 7 in which said indicator device comprises a rectangular plastic plate defining said aperture.

10. The container and indicator device of claim 9 in which the lower side of the inner peripheral wall of said plate defining said aperture is angled outwardly by about 20° to 60° to facilitate the sliding of said device along said container.

11. A flexible, collapsible fluid container having a fluid access port at one end thereof, said container having a numerical scale on its surface indicative of the amount of fluid present in and expended from said container, said container carrying an indicator device for measuring the fluid volume within said container which comprises a flat, generally stiff plate defining an aperture, said aperture being shaped to facilitate, as fluid is drained from the bottom of said container while the container is vertically hung, the downward sliding of the indicator device along the container in uniformly reproducible manner, whereby said plate arrives at each individual member of the numerical scale on the container when said container holds that amount of fluid indicated by said individual member.

12. The container and indicator device of claim 11 in which said aperture also defines a pair of auxiliary, oval portions at opposite ends of the long axis of said oval central portion which are smaller than said central portion, said auxiliary portions having long axes which are generally coaxial with the long axis of said central portion, said central portion and auxiliary portions defining throat portions communicating between said central and auxiliary portions.

13. The container and indicator device of claim 12 in which said aperture also defines a pair of small, generally semicircular portions facing and communicating with said oval central portion at opposite ends of the short axis of said ellipsoidal central portion, to accommodate longitudinal folds which form in the container as said container collapses.

14. The container and indicator device of claim 13 in which the lower side of the inner peripheral wall of said plate defining said aperture is angled outwardly to facilitate the sliding of said device along said container.

* * * * *